Patented July 12, 1932

1,866,632

UNITED STATES PATENT OFFICE

HUGH ALBERT EDWARD DRESCHER, DAVID ALEXANDER WHYTE FAIRWEATHER, AND JOHN THOMAS, OF GRANGEMOUTH, SCOTLAND, ASSIGNORS TO SCOTTISH DYES, LIMITED, OF GRANGEMOUTH, SCOTLAND

MANUFACTURE OF AROMATIC ACIDS

No Drawing. Application filed July 6, 1929, Serial No. 376,487, and in Great Britain August 4, 1928.

This invention relates to the production of vat dyestuff intermediates and the like, particularly to the production of $\alpha$-naphthoic acid or benzoic acid or both bodies, and also to the action of alkaline earth metal salts of $\alpha$-naphthoyl-ortho-benzoic acid under heat in the presence of an oxide or hydroxide of an alkaline earth metal.

The object of the invention is to provide improved or modified process for the production of dyestuff intermediates and the like.

In British patent specification No. 289,544 a process is described for the production of phenyl-$\alpha$-naphthyl-ketone, which consists in heating an alkaline earth metal salt of $\alpha$-naphthoyl-ortho-benzoic acid to an elevated temperature preferably in the presence of an oxide or a hydroxide of an alkaline earth metal. We have now found that by carrying out the reaction under milder conditions, especially by heating only for a short time that instead of phenyl-$\alpha$-naphthyl-ketone we can obtain a mixture of $\alpha$-naphthoic acid and benzoic acid.

Gabriel and Coleman, Berichte, 1900, 33, 448, have described the obtaining of $\alpha$-naphthoic acid from $\alpha$-naphthoyl-ortho-benzoic acid by fusing with caustic potash, but they obtained considerable quantities of naphthalene, and stated that the yield of $\alpha$-naphthoic acid was only small.

In comparison with that process, the process of the present application has the economic advantage that the caustic potash may be replaced by a much cheaper compound, viz., calcium hydroxide.

The invention in brief consists in the process which comprises the subjection of alkaline earth metal salts of $\alpha$-naphthoyl ortho-benzoic acid to the action of heat in the presence of a hydroxide of an alkaline earth metal for a short time for the production of $\alpha$-naphthoic acid and benzoic acid.

The invention also consists in the application of the process of the preceding paragraph to di-aryl-ketone-carboxylic acids generally.

The invention also consists in processes substantially as herein described, and in products which may be made thereby.

The following examples illustrate how the invention may be carried into effect, all parts being parts by weight:

Example 1

The sodium salt of 2-$\alpha$-naphthoyl-benzoic acid is dissolved in water and calcium chloride added. The precipitate of the calcium salt which forms is filtered off and dried.

50 parts of this calcium salt are mixed with 13.6 parts of calcium hydroxide of 92% strength, and heated. The mass becomes liquid and homogeneous. It is stirred and the temperature raised to about 300 to 350° C. It is kept at this for about 15 minutes.

The heating is then stopped and the mass cooled and broken up. It is boiled with a solution of sodium carbonate and the calcium carbonate which is precipitated filtered off and washed.

The combined filtrates and washings are diluted to about 1200 parts, raised to the boil and the naphthoic acid precipitated by the addition of hydrochloric acid.

The naphthoic acid is filtered off hot and washed with hot water. The product without further purification is white in colour and melts at 159 to 160° C. The filtrate is allowed to cool when the benzoic acid crystallizes out and is filtered off.

Example 2

226 parts of 2-benzoyl-benzoic acid and 40 parts of 92% calcium hydroxide are well mixed together in the form of a paste with water. The mixture is then dried; it first becomes liquid and then sets solid again.

20 parts of the dried product are then mixed with 6.6 parts of 92% calcium hydroxide and heated. The mixture first liquefies and then becomes stiff again.

The temperature is raised to about 300–350° C. for a few minutes. The mass is allowed to cool, broken up and dissolved in 200 parts of water with sodium carbonate, the lime removed by filtering, the filtrate acidified and left to crystallize. The resulting crystals of benzoic acid are then filtered off.

*General*

The invention is not limited to the above examples, but includes for instance di-aryl-ketone-carboxylic acids generally.

In some cases such as 2-benzoyl-benzoic acid a single product is obtained, e. g., benzoic acid, but usually two different carboxylic acids are obtained. These may be separated by making use of the differences in solubility of the two acids or their salts in water or in other solvents or by sublimation. Substituted ketone-carboxylic acids may be employed in the reaction for the production of substituted carboxylic acids.

By working according to the examples given above, the reaction proceeds very smoothly, and yields approaching the theoretical are obtained while the products are of excellent quality.

If desired, the starting materials may be prepared from the cheap and readily available phthalic anhydride.

Having now described our invention, what we claim as new and desire to secure by Letters Patent is:—

1. The process which consists in heating together the calcium salt of 2-α-naphthoyl-benzoic acid and calcium hydroxide for a shorter time than is necessary to produce phenyl naphthyl ketone and until the mass becomes liquid, raising the temperature to about 300 to 350° C., cooling the mass, treating it with a solution of an alkaline carbonate separating the calcium carbonate thus formed, diluting the liquor, raising it to the boil and adding hydrochloric acid for the precipitation of the naphthoic acid.

2. A process for the production of α-naphthoic acid and benzoic acid which consists in heating alkaline earth metal salts of α-naphthoyl-ortho-benzoic acid in the presence of an hydroxide of an alkaline earth until samples show that substantially none of the starting material remains and substantially no phenyl-naphthyl ketone is formed.

3. A process for the production of α-naphthoic acid and benzoic acid which consists in subjecting alkaline earth metal salts of α-naphthoyl-ortho-benzoic acid to the action of heat in the presence of an hydroxide of an alkaline earth metal for a shorter time than is necessary to produce phenyl-naphthyl ketone.

4. A process as claimed in claim 3 applied to di-aryl-ketone-carboxylic acids generally.

In testimony whereof we have signed our names to this specification.

HUGH ALBERT EDWARD DRESCHER.
DAVID ALEXANDER WHYTE FAIRWEATHER.
JOHN THOMAS.